(12) United States Patent
Barthelemy et al.

(10) Patent No.: US 7,380,876 B1
(45) Date of Patent: Jun. 3, 2008

(54) HYDROFORMED MEMBERS WITH INTERNAL BULKHEAD

(75) Inventors: Bruno Barthelemy, Lake St Louis, MO (US); Dragan Stojkovic, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 11/230,681

(22) Filed: Sep. 20, 2005

Related U.S. Application Data

(60) Provisional application No. 60/625,912, filed on Nov. 8, 2004.

(51) Int. Cl.
*B62D 25/08* (2006.01)
(52) U.S. Cl. .......... 296/205; 296/203.01; 296/29; 52/731.6; 29/897.2
(58) Field of Classification Search .......... 296/205, 296/203.01, 204, 203.02, 203.03, 203.04, 296/209, 29, 30; 293/102, 155; 280/781, 280/798, 785, 796; 52/731.6; 29/897.2, 29/421.1, 525.14
See application file for complete search history.

(56) References Cited

U.S. PATENT DOCUMENTS

| | | | |
|---|---|---|---|
| 6,416,119 B1 | 7/2002 | Gericke | 296/205 |
| 7,281,757 B2 * | 10/2007 | Dupuis et al. | 296/205 |

* cited by examiner

*Primary Examiner*—Joseph D Pape
(74) *Attorney, Agent, or Firm*—Gigette M. Bejin, Esq.; Miller Law Group, PLLC

(57) ABSTRACT

A hydroformed tubular frame member includes an internal bulkhead member that is formed during the hydroforming process during which the frame member is manufacture from tubular stock material. The internal bulkhead is cut from one face by piercing three sides of a weld access opening with the die in which the tubular frame member is formed during the hydroforming process. The bulkhead member is then bent along the fourth side of the weld access opening and shaped into a folded configuration that includes a vertical portion spanning the distance between the opposing faces of the frame member, and a horizontal portion to facilitate welding to the opposing face. The provision of the internal bulkhead member increases stiffness in the tubular frame member and reduces the matchboxing effect associated with hydroformed tubular frame members. The frame member with internal bulkhead is particularly advantageous in manufacturing an automotive frame.

14 Claims, 4 Drawing Sheets

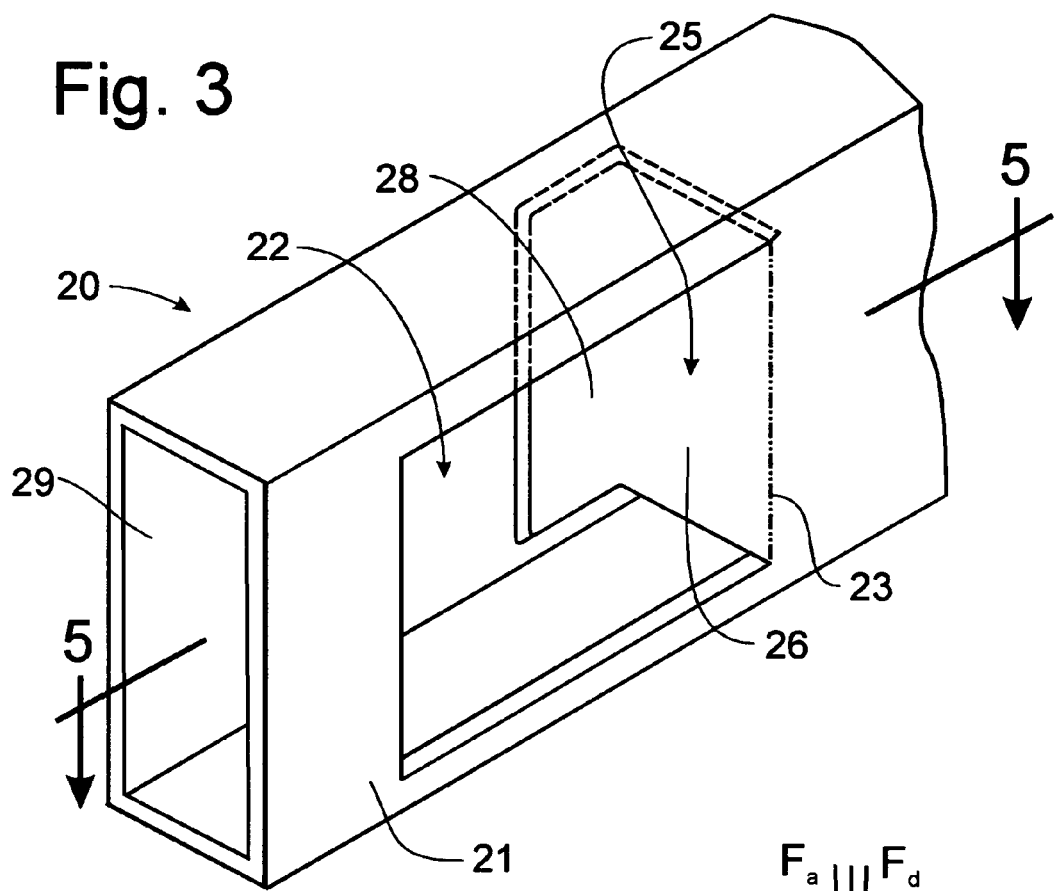
Fig. 3
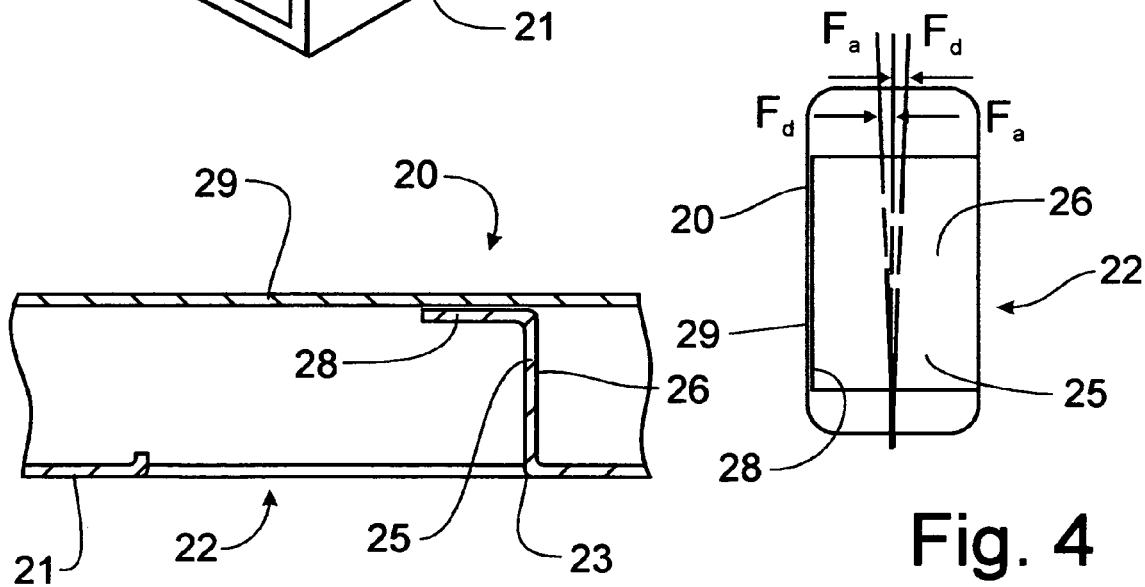
Fig. 5
Fig. 4

HYDROFORMED MEMBERS WITH INTERNAL BULKHEAD

CROSS-REFERENCE TO RELATED APPLICATIONS

This application claims domestic priority on U.S. Provisional Patent Application Ser. No. 60/625,912, filed on Nov. 8, 2004, the contents of which are incorporated herein by reference.

BACKGROUND OF THE INVENTION

Conventional front end assemblies in automotive vehicles are often made by stamping and welding together several individual frame components. One of the major challenges for manufacturing is to maintain rigidity because these assemblies are often a combination of a number of various frame parts. As each of the frame parts are attached to form subassemblies and then are attached to the body portion of the vehicle, it becomes more difficult to achieve the necessary or desired stiffness in the front end. This problem is sometimes referred to as "matchboxing." Matchboxing is a phenomenon that occurs when the sheet metal portion of the vehicle is attached to the frame and tends to sway on a hinge point and move from a desired perfect square orientation to a parallelogram orientation. Distorting the sheet metal in this manner may result in poor natural frequency characteristics of the front end structure.

Manufacturing processes for automobiles have evolved from one that utilized MIG welding processes, i.e. a welding process in which a line of molten material is deposited by the welder in joining two pieces of metal together. Spot-welding, a process involving the passage of electrical current between two electrodes to melt and join two pieces of metal placed between the electrodes, is being utilized in a greater degree in the manufacturing of automotive vehicles. Spot-welding requires a frame design that is conducive to being manufactured using the spot-welding process. For example, if two tubular members are being spot-welded, access to the adjoining walls of the two tubular members by the spot-welder electrodes must be provided.

Hydroformed tubular elements are frequently being used in the construction of vehicle body structures to take advantage of the spot-welding manufacturing techniques. Hydroforming is a metal forming process that uses high pressure fluids to outwardly expand tubular blanks into a die so that the tubular blank conforms to the surfaces of the die cavity, thus forming a contoured hydroformed part. Access openings in the contoured hydroformed part for the insertion of spot-welding electrodes can be formed during the manufacturing process by inserting cutouts in the die cavity so that the periphery of the tubular wall is pierced by the cutout during the expansion process. The leftover slug is usually completely removed from the hydroformed part.

Vehicle front end hydroformed structure requires tube-to-tube and tube-to-cowl welded joints in the formation of the manufactured vehicle front end. Such welded joints require large weld access openings that often remove most of the material on a side of the hydroformed structural member. Once assembled, the operative vehicle front end the hydroformed tubes undergo bending and torsion modes. During this torsion cycle, the hydroformed tubes tend to matchbox, which creates higher loading in the tube-to-tube and tube-to-cowl joints and can cause material fatigue and cracking. This matchbox phenomenon is more likely when the hydroformed members have been formed with a large weld access opening. Increasing the stiffness of hydroformed parts can be accomplished through conventional means by increasing the gage (or thickness) of the material, by making the part large (increasing the geometry of the member), by attaching secondary reinforcements (such as by welding); or by using pre-formed structural foams, all of which add significant cost to the manufacture of a vehicle front end assembly.

Vehicle front end assembly processes have yet to take full advantage of the capabilities of tubular hydro-formed parts. A number of prior patents have described the use of tubular members in hybrid front end assemblies, but fail to address the matchboxing issue. For example, Gerricke et al., U.S. Pat. No. 6,416,119, describes a vehicle front end constructed through the use of hydro-formed tubes. In Gerricke, a first body structure formed from a plurality of tube members and a second body structure formed from sheet metal are welded to each other in a sandwiching relationship. However, this method is still subject to matchboxing because the sheet metal structure can be distorted as it is secured to the tube members.

There is a need for a front end construction that may incorporate the use of hydroformed tubes that provides superior stiffness and rigidity capabilities. There is a further need for a front end assembly process that minimizes any tendency of the assembly to distort or matchbox.

SUMMARY OF THE INVENTION

It is an object of this invention to overcome the disadvantages of the prior art by providing an internal bulkhead for a hydroformed tubular frame member.

It is another object of this invention to provide a process by which an internal bulkhead for a tubular frame member can be formed during the hydroforming process that creates the tubular frame member.

It is a feature of this invention that the formation of the internal bulkhead increases stiffness in the tubular frame member.

It is an advantage of this invention that the provision of the internal bulkhead in the hydroformed tubular frame member reduces matchboxing in the frame member under torsional loading of the frame member.

It is another feature of this invention that the internal bulkhead is formed during the hydroforming process creating the frame member from tubular stock.

It is another advantage of this invention that the internal bulkhead can be spot-welded into position after the conclusion of the hydroforming process.

It is still another feature of this invention that the internal bulkhead is formed by the piercing die during the hydroforming process creating the tubular frame member from tubular stock material.

It is still another advantage of this invention that the formation of the internal bulkhead member does not require a separate manufacturing step.

It is yet another advantage of this invention that the volume of scrap material associated with the formation of a conventional hydroformed frame member having weld access holes formed therein during the hydroforming process is reduced.

It is a still another object of this invention to provide an internal bulkhead for a hydroformed frame member that is durable in construction, inexpensive of manufacture, carefree of maintenance, facile in assemblage, and simple and effective in use.

It is yet another object of this invention to provide a hydroforming process for the manufacture of a tubular frame member with an internal bulkhead member to increase the stiffness of the hydroformed frame member.

These and other objects, features and advantages are accomplished according to the instant invention by providing a hydroformed tubular frame member that includes an internal bulkhead member that is formed during the hydroforming process during which the frame member is manufacture from tubular stock material. The internal bulkhead is cut from one face by piercing three sides of a weld access opening with the die in which the tubular frame member is formed during the hydroforming process. The bulkhead member is then bent along the fourth side of the weld access opening and shaped into a folded configuration that includes a vertical portion spanning the distance between the opposing faces of the frame member, and a horizontal portion to facilitate welding to the opposing face. The provision of the internal bulkhead member increases stiffness in the tubular frame member and reduces the matchboxing effect associated with hydroformed tubular frame members. The frame member with internal bulkhead is particularly advantageous in manufacturing an automotive frame.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is a partial perspective view of a hydroformed structural frame member similar to that of FIG. 1, but formed according to the principles of the instant invention to incorporate an integral bulkhead internally of the frame member;

FIG. 4 is a schematic cross-section of the hydroformed structural frame member depicted in FIG. 3;

FIG. 5 is a cross-sectional view of the hydroformed structural frame member corresponding to lines 5-5 of FIG. 3 taken through the middle of the weld access opening;

DETAILED DESCRIPTION OF THE PREFERRED EMBODIMENT

Referring to FIGS. 3-7, a hydroformed structural member forming a part of an automobile frame through a process incorporating the principles of the instant invention can best be seen. The automotive frame is preferably formed from as many hydroformed tubular members as possible. Such tubular members can be spot-welded to form an integral frame assembly for the front end of a vehicle, as well as other frame components of the automotive vehicle.

Hydroforming is a process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. Through die cutouts, access openings can be formed into the re-shaped tubular member to permit spot-welding electrodes to gain access to opposing adjacent sides so as to create a weld bond between juxtaposed members. In this manner, a frame, as an example for an automobile, can be created using in large part hydroformed tubular members.

Figure 1:
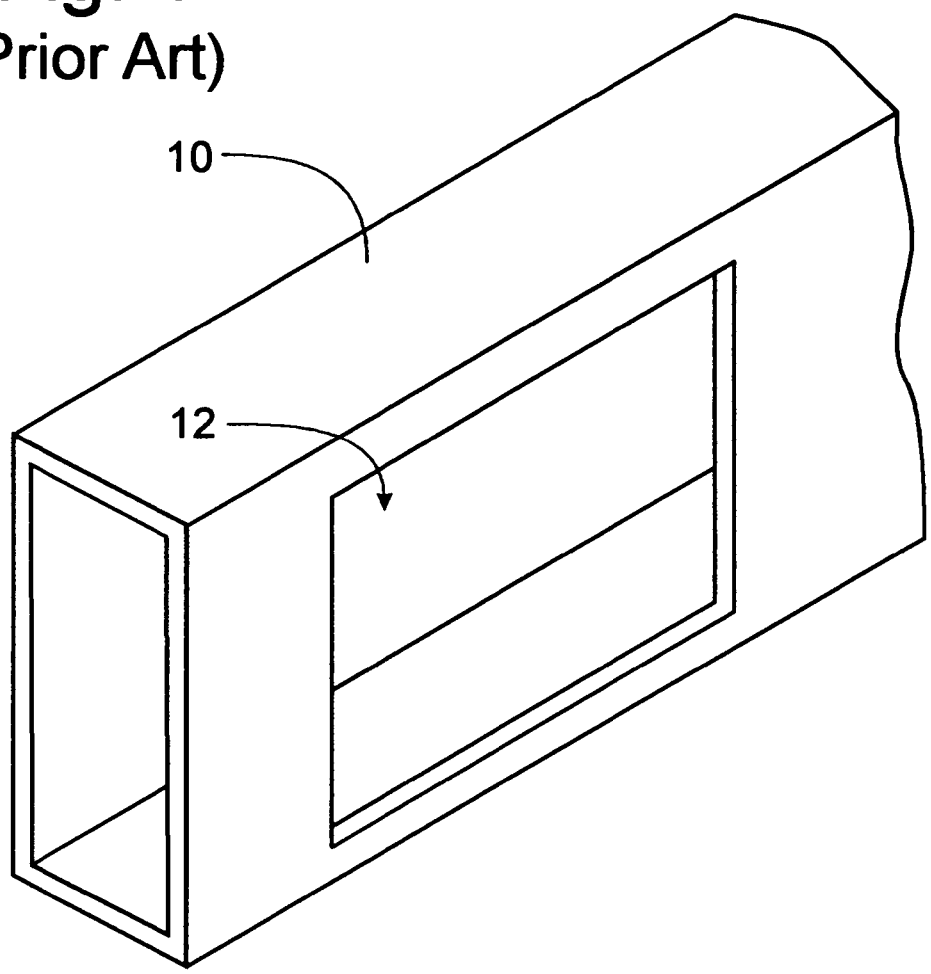
FIG. 1 is a partial perspective view of a conventional hydroformed frame member having a large weld access hole formed therein for use in the manufacture of an automotive vehicle front end assembly.
Figure 2:
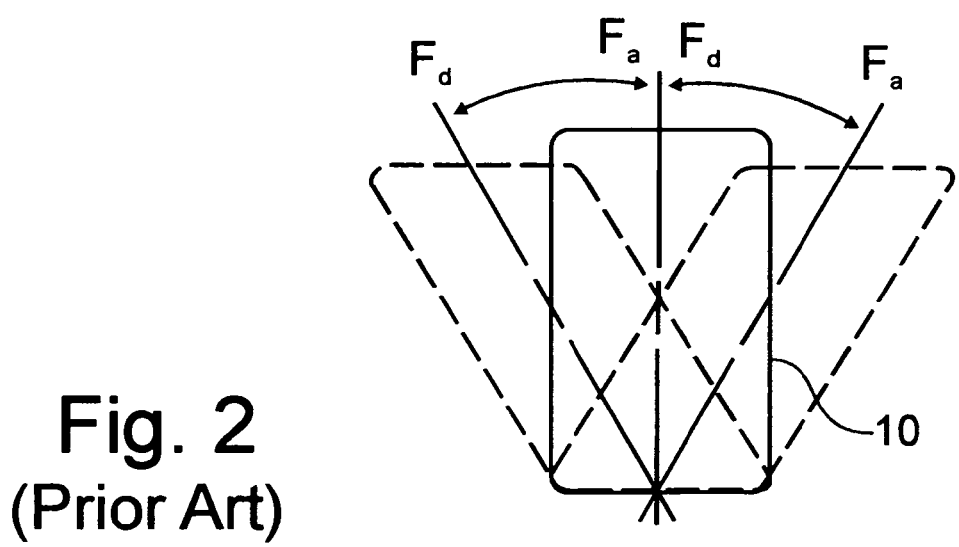
FIG. 2 is a schematic cross-sectional view of the conventional hydroformed member depicted in FIG. 1, with the distortion referred to as "matchboxing" being depicted in phantom to both sides of the section.
Figure 6:
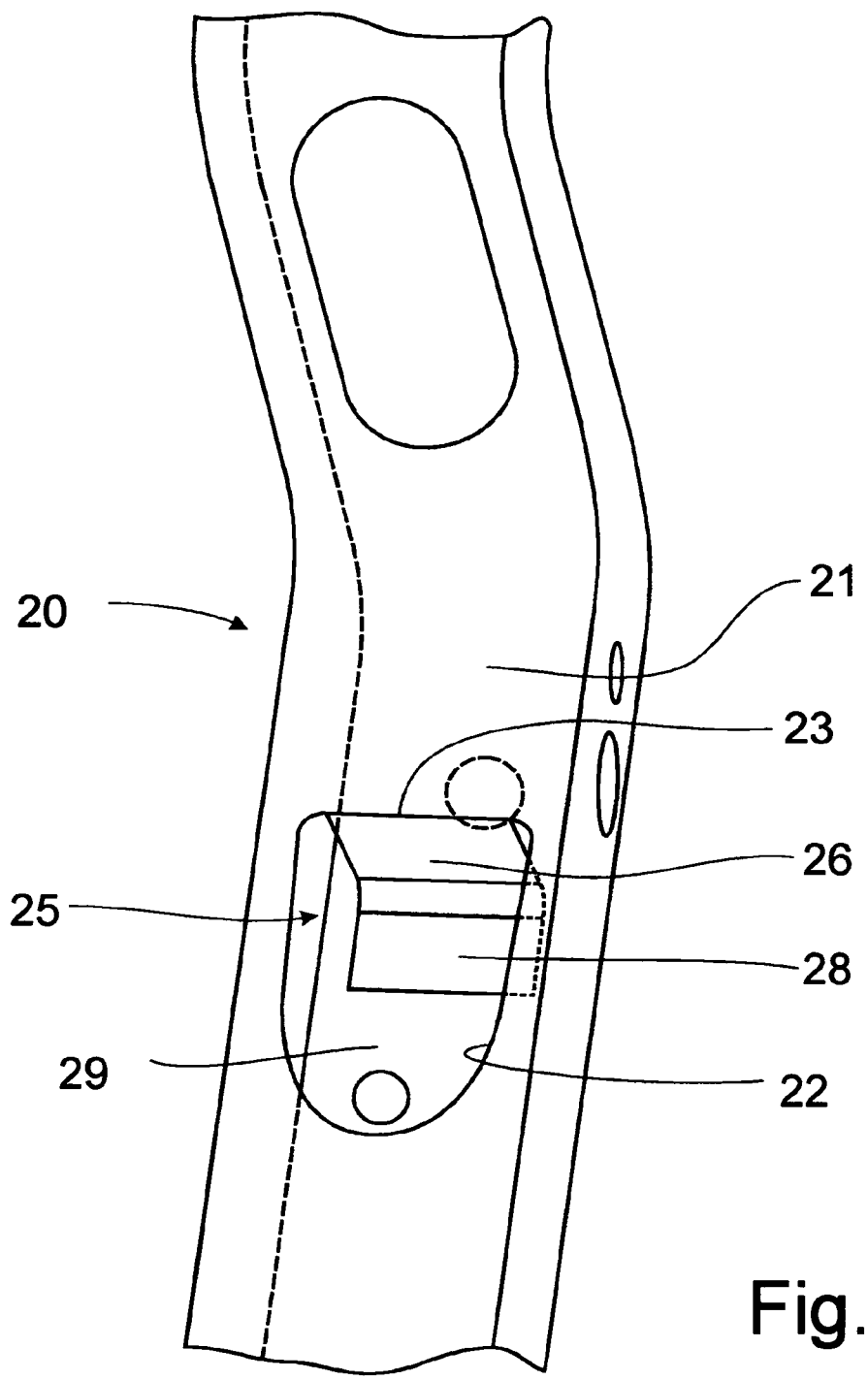
FIG. 6 is a schematic perspective view of a portion of a hydroformed structural frame member formed according to the principles of the instant invention.
Figure 7:
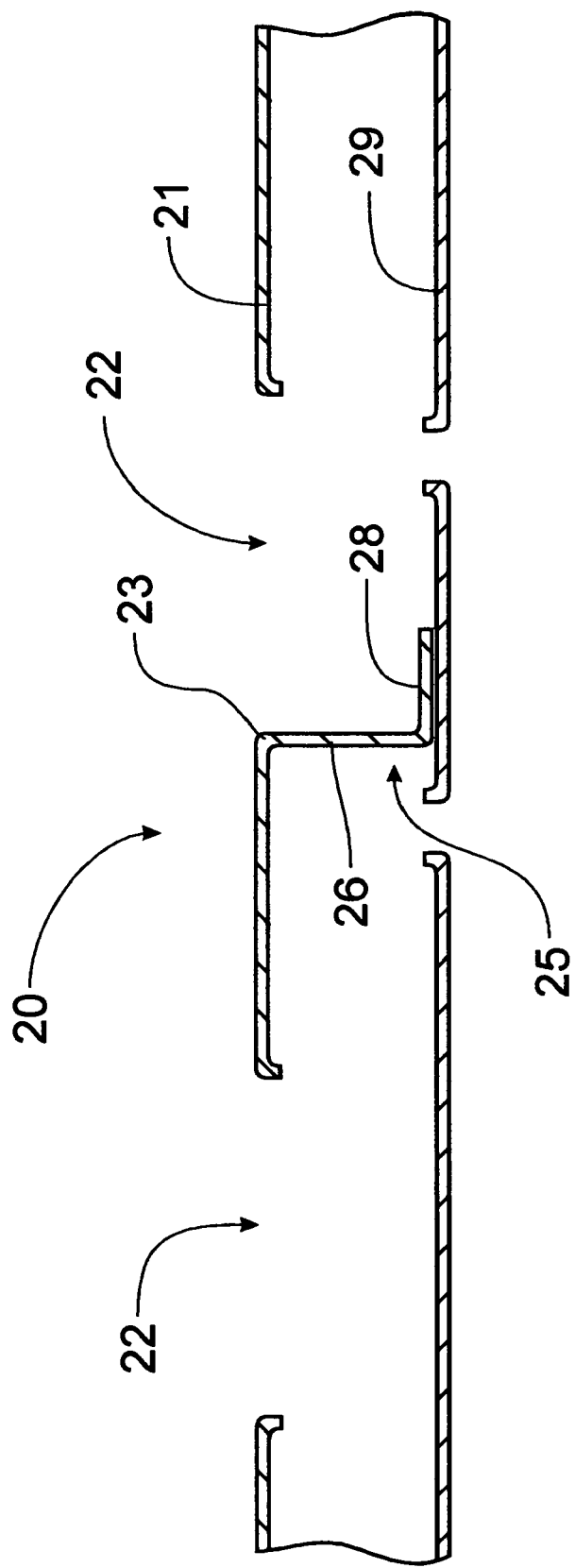
FIG. 7 is a cross-sectional view taken along the longitudinal centerline of the hydroformed structural frame member depicted in FIG. 6.

The conventional hydroformed structural member 10 is shown in FIG. 1 where the tubular blank has been expanded in the die and the weld access opening 12 has been formed in one surface of the structural member with the "slug" or leftover blank formed by cutting out the access opening 12 being completely removed from the structural member 10. In FIG. 2, the phenomenon known as "matchboxing" is schematically depicted. Under stress, particularly torsional stress, imparted to the front end frame structure of an automotive vehicle, the hydroformed member can move into a parallelogram cross-sectional configuration, instead of the stronger rectangular cross-sectional shape.

Referring to the hydroformed structural member 20 depicted in FIGS. 3-7, the weld access opening 22 is only pierced on three sides of the opening 22, thus retaining the slug or leftover blank 25 affixed to the uncut fourth side 23 of the opening 22. The leftover blank 25 is then shaped by a tool (not shown), sized to form a vertical portion 26 having a height substantially the same as the internal height of the hydroformed structural member 20 and a horizontal portion 28 bent at approximately right angles to the vertical portion. The horizontal portion 28 being formed of the remainder of the leftover blank 25 after the vertical portion 26 is formed.

The horizontal portion 28 is then spot-welded to the bottom side 29 of the hydroformed structural member 20 to rigidly fix the leftover blank 25 in an "L" shape. The leftover blank 25 is bent from the top side 21 of the member 20, where the blank 25 remains attached to the top side 21 of the structural member, through the vertical portion 26 and then bent again into the horizontal portion 26 which is welded to the bottom side 29 of the member 20. Thus, the leftover blank 25 is formed into an integral, internal bulkhead 25 in the hydroformed structural member 20.

The bulkhead 25 substantially improves the stiffness of the hydroformed structural member 20 and greatly increases the resistance to the matchboxing phenomena under torsional loading. Tests have shown that the matchboxing phenomena are almost completely eliminated. The cost of enhancing the stiffness of the hydroformed structural member is minimal as no additional parts are require, as material that is conventionally scrapped is utilized to form the bulkhead 25. The need for supplemental measures to increase stiffness is no longer present, including increasing the gage of the material and increasing the geometry of the member.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a hydroformed structural frame member formed from tubular stock blanks and having a tubular cross-sectional configuration with a first face and an opposing second face separated from said first face by a depth dimension, said hydroformed structural frame member being formed with a weld access opening into said first face of said structural frame member, the improvement comprising:

an internal bulkhead member connected to said first face of said structural frame member at said weld access opening and welded to said second face of said structural frame member to span said depth dimension.

2. The hydroformed structural frame member of claim 1 wherein said internal bulkhead member is integral with said first face of said structural frame member and bent therefrom toward said second face of said structural frame member.

3. The hydroformed structural frame member of claim 2 wherein said internal bulkhead member is bent into a configuration that includes a vertical portion and a horizontal portion, said vertical portion spanning said depth dimension between said first and second faces of said structural frame member and said horizontal portion being parallel to said second face of said structural frame member to facilitate welding of said horizontal portion to said second face.

4. The hydroformed structural frame member of claim 3 wherein said internal bulkhead member is formed from said first face of said structural frame member by piercing three sides of said weld access opening during the hydroforming process.

5. The hydroformed structural frame member of claim 4 wherein said internal bulkhead member is bent along a fourth side of said weld access opening to form said vertical portion while being integral with said first face.

6. The hydroformed structural frame member of claim 3 wherein said bulkhead member has a transverse width dimension perpendicular to said depth dimension, said transverse width dimension being smaller than a corresponding transverse width dimension of said structural frame member.

7. The hydroformed structural frame member of claim 3 wherein said frame member is rectangular in cross-sectional configuration with a width dimension perpendicular to said depth dimension, said width dimension being greater than said depth dimension, said first and second faces of said structural frame member defining said width dimension.

8. The hydroformed structural frame member of claim 7 wherein said bulkhead member has a transverse width dimension perpendicular to said depth dimension, said transverse width dimension being smaller than said width dimension of said structural frame member.

9. An automotive frame member for a vehicle comprising:

a first face defining a width dimension of said structural frame member;

a second face opposing said first face and being spaced therefrom a distance corresponding to a depth dimension of said structural frame member;

a weld access opening formed in said first face; and an internal bulkhead member connected to said first face of said structural frame member at said weld access opening and welded to said second face of said structural frame member to span said depth dimension.

10. The automotive frame member of claim 9 wherein said internal bulkhead member is formed during a hydroforming process from said first face by piercing three sides of said weld access opening during the hydroforming process and bending said internal bulkhead member toward said second face.

11. The automotive frame member of claim 10 wherein said internal bulkhead member is bent along a fourth side of said weld access opening such that said internal bulkhead member is integral with said first face.

12. The automotive frame member of claim 10 wherein said internal bulkhead member is bent into a configuration that includes a vertical portion integrally connected to said first face and a horizontal portion bent generally parallel to said second face, said vertical portion spanning said depth dimension between said first and second faces of said structural frame member and said horizontal portion being welded to said second face.

13. The automotive frame member of claim 12 wherein said frame member has a rectangular cross-sectional configuration with said width dimension being greater than said depth dimension.

14. The automotive frame member of claim 13 wherein said internal bulkhead member has a transverse width dimension that is smaller than said width dimension of said frame member.

* * * * *